Patented Nov. 10, 1942

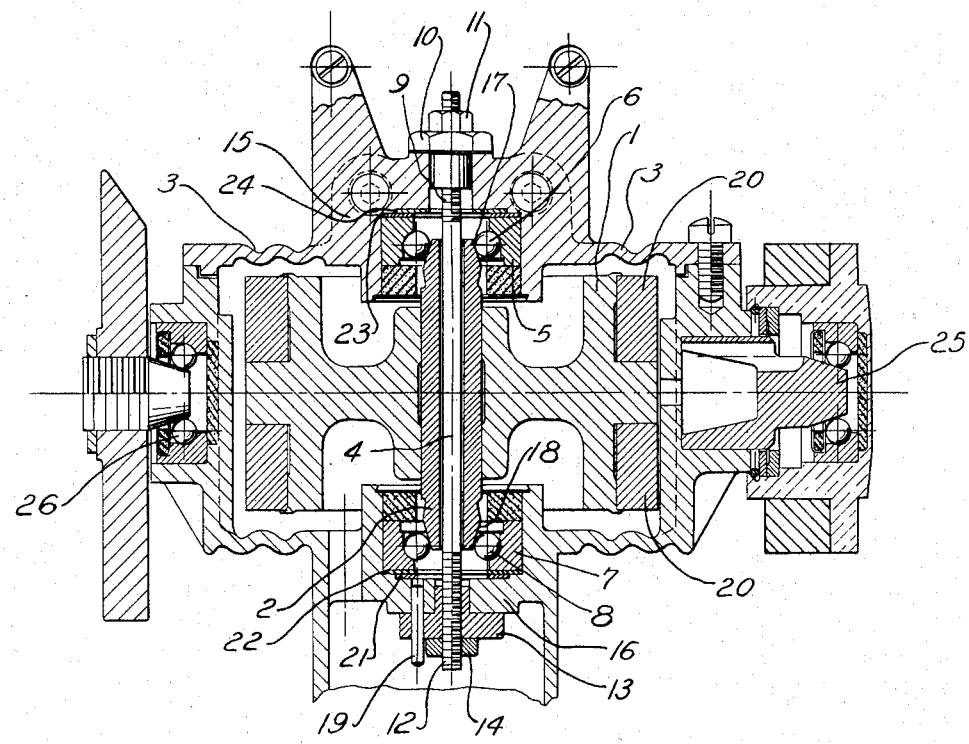

2,301,700

UNITED STATES PATENT OFFICE 2,301,700

ROTOR

Ralph M. Heintz, Cleveland, Ohio, assignor to Jack & Heintz, Inc., Cleveland, Ohio Application December 31, 1941, Serial No. 425,246

8 Claims. (Cl. 308—230)

This invention relates in general to rotors and more particularly to a new and novel method and means for mounting a gyroscope rotor within its bearings supported by the rotor housing and for providing temperature compensation so as to maintain the correct freedom between the rotor and its bearings over a wide range of temperature variations.

In high precision instruments involving high speed rotors such as are found in gyroscopes, one of the greater problems has been to avoid binding or end play between the gyroscope rotor axle and its bearings carried by the rotor housing, because of the unequal coefficients of expansion of the parts of the assembly and the consequent failure to maintain constant bearing clearances between the rotor axle and its bearings. The conventional practice has been to bevel the two ends of the rotor pivot and to construct the rotor bearing to consist of a ball bearing race assembly which is resiliently urged into engagement with the conical bearing surface of the pivot.

It is therefore one of the primary objects of my invention to provide a new and novel means and method for predeterminedly compensating for temperature conditions and variations and in accomplishing this object I propose to extend a rigid internal strut extending through the two end bearing assemblies carried by the housing with clearance to engage in clamping relation the upper and lower extremities of the rotor housing. By means of adjusting nuts on either end of the strut the bearing assemblies are forced into engagement with the bearing surface of the rotor pivot and the housing is placed vertically under compression, which, accordingly places the strut under tension.

The main object of the invention as it applies to a rotor axle and its bearings is to maintain constant bearing clearances and thus eliminate binding and end play between the rotor axle and its bearings and to also insure such freedom of operation of the rotor about its axis over a wide range of temperatures.

Accordingly, by my proposed method and means, and regardless of the coefficients of expansion of the rotor axle and the housing, bearing clearances between the rotor axle, or pivot, and the housing supported bearings are maintained constant and consequently binding or end play between the bearings and the rotor axle is eliminated because the housing is precontracted under compression by the strut adjusting nuts pressing inwardly simultaneously on the upper and lower sides of the housing while the strut is correspondingly pre-expanded under tension. So far as the clearances between the rotor end pivots and their bearings, carried by the housing, are concerned, any tendency for the housing to contract under low temperature conditions is compensated for by the fact that the housing has been structurally pre-contracted to that extent in assembling the same and hence no variation in vertical dimensions takes place and consequently the bearing clearances are maintained constant. Likewise, any tendency on the part of the housing, carrying the rotor bearings, to expand under high temperatures is compensated for by the fact that the rigid strut has been structurally pre-expanded under tension, preventing expansion of the housing and consequently the bearing clearances are maintained constant.

With the foregoing and other objects in view, my invention resides in the new and novel method and means and in the combination of parts and details of construction set forth in the following specification and appended claims, certain embodiments thereof being illustrated in the accompanying drawing, in which:

Figure 1 is a view in vertical section through a gyroscope rotor assembly and its housing and also showing the rotor axle and bearings and tension strut; and Figure 2 is a schematic view of the rotor housing, illustrating in full lines the housing before compression and in dotted lines the shape of the housing under contraction imposed by the action of the tension strut.

Referring more particularly to the drawing, it should be understood that so far as the present invention is concerned and so far as it is applicable to a gyroscopic rotor, as will be described as one embodiment of my invention, only those parts of the rotor, its bearings and housing that have any definite relation to my invention necessitate any detailed description.

With this in mind, the gyro rotor 1 rotates about a pivot 2, as its vertical axis, in bearings carried by a housing 3. As is conventional practice, the rotor assembly, including its housing, may be mounted in the usual gimbal frame and supported in the usual manner in the vehicle adapted to carry it so as to provide for three degrees of freedom, that is, freedom of rotation in three planes. As will be apparent from the following disclosure, however, the rotor housing and my novel means and method of mounting the rotor in its bearings carried by the housing renders it interchangeable as a vertical axis rotor for a horizon gyro or as a horizontal axis spinning rotor for a directional gyro for automatic pilots. In Figure 1 there are shown trunnions 25 and bearings 26 to provide for free oscillation of the assembly about a horizontal axis which is conventional construction well known in the art.

The rotor pivot 2 is preferably press fitted into the rotor 1 so as to rotate therewith. At the upper end of the rotor and between the upper surface 15 of the housing and the pivot 2 is a ball bearing assembly including a race 5 having balls 6 that bear and roll on the conical bearing surface 17 of the pivot 2. At the lower end and between the lower surface 16 of the housing and the pivot is a ball bearing assembly with a race 7 and balls 8 that ride on the conical face 18.

As a practical matter for assembling, an adjustment sleeve 13 and follow-up lock nut 14 are screwed on the screw threads 12 of the bottom of a rigid adjustment tension strut 4 to approximately the extent shown in Figure 1. The strut 4 is then inserted through the lower surface 16 of the rotor housing and through the rotor pivot 2 and thence upwardly through the upper surface 15 of the rotor housing, there being provided a predetermined normal clearance between the strut and the rotor pivot. A locking pin 19 may then be pushed through the nut 13 and into a recess in the housing at 16 to lock the nut 13 against rotation.

The upper end of the strut 4 is screwthreaded at 9 to engage an adjustment sleeve nut 10 resting on the upper surface of the upper portion 15 of the housing. A tightening of the nut 10 by screwing of the same downwardly on the strut brings about a compression and pre-contraction of the central portion of the rotor housing simultaneously on its upper and lower sides 15 and 16 and correspondingly places the strut longitudinally under tension by pre-expansion, and when the factors governed by these forces are arrived at the followup lock nut 11 is tightened to hold the strut in the properly adjusted position under tension and consequently the housing under proper pre-contraction.

In order to accurately estimate the proper degree of tension under which to place the strut and consequently the degree of compression under which to place the housing, it is essential to take into consideration the coefficients of expansion of the metals of the parts involved, their effective length relative to the axis of the strut and the range of temperature variations to be accounted for. For instance, assuming the strut and pivot to both be made of steel, the metals thereof should be slightly different so that the pivot, being shorter than the strut, should have a greater coefficient of expansion than that of the strut.

More particularly is it true in aeronautical instruments that lightness in overall weight is of utmost importance. Thus in rotor assemblies for gyroscopes and also those used in the automatic pilot art, the main body of the rotor may be of aluminum and provided with peripheral steel members such as shown at 20, whereas the housing 3 may be made of aluminum or even magnesium or other light weight metal having relatively high coefficients of expansion, whereas the rotor pivot and tension strut, as well as the rigid tension strut are made of steel which has a relatively low coefficient of expansion.

Thus, with these component parts of the proportional relative effective sizes illustrated in Figure 1, it may be desirable to provide for compensated freedom of operation in temperatures from minus 50° F. or below to plus 150° F. or above. Accordingly, the adjustment nut 10 is screwed downwardly on the strut 4 until the central portion of the housing has been pre-compressed in the order of .005 inch and the strut correspondingly pre-expanded under tension in the order of .005 inch. Thus when subjected to low temperatures down to minus 50° F. or below, any tendency for longitudinal contraction of the central portion of the housing is compensated for by the fact that during installation under normal temperature conditions it was compressed and pre-contracted to the same degree that it would otherwise have contracted under low temperatures of minus 50° F. or below. Inasmuch as such variance in temperature is predeterminedly compensated for, the component parts retain their same relative relationships and constant bearing clearance and freedom of operation is obtained and binding or end play is eliminated. The same result is obtained with respect to high temperatures of the order of plus 150° F. or above, due to the fact that any tendency for expansion of the housing is compensated for and resisted by the fact that the strut has been pre-expanded .005 inch under tension during installation at normal temperature and to an extent equal to the amount that such plus 150° F. or above, temperature would otherwise have expanded it longitudinally. In other words, the tension strut when assembled in the housing transforms the latter from a relatively resilient structure whose vertical length would otherwise be subject to change under varying temperature into a rigid structure of constant length regardless of variation of temperature conditions.

Suitable washers 21 and 22 are interposed between the lower frame 8 and the lower ball race 7 while between the upper frame 15 and the upper ball race 5 are arranged spacers 23 and 24 in order to control the play during the installation operation of compressing the unit by the tightening of the adjustment nut 10 on the strut 4.

The forces involved may be better understood by reference to Figure 2 wherein the rotor housing is schematically shown at 3. The clamping and pre-contracting force, brought about by the tightening of the adjustment nuts on the tension strut, is indicated by the oppositely pointing arrows C—D. This force compresses the central portion of the housing to distort the same from the full line F to the downwardly bowed position indicated by the dotted line E, here exaggerated for purposes of illustration. The double arrow line A represents the normal vertical effective dimensions of the housing, prior to assembling and tightening of the strut, and B the vertical effective dimensions of the housing after pre-contraction by the rigid tension strut. In accordance with the previously described specific example of .005 inch pre-contraction for a temperature range of from minus 50° F. or below, to plus 150° F., or above, the distance B is .005 inch shorter in length than A.

As stated before, the primary object is to provide for compensated freedom of operation of the rotor about its structural axis of rotation by the maintenance of constant bearing clearances. Thus, the maintenance of a constant vertical length of the central portion of the rotor housing is the prime consideration because the housing carries the bearings for engagement by the rotor pivot.

As an added refinement and safety measure for temperature compensation, I may construct the housing of magnesium and pre-form it to be laterally corrugated in form at its outer portions as shown at 3 in Figure 1. The purpose of this is to provide for temperature compensation against the outer portions of the housing changing its effective vertical length with respect to the axis of rotation under temperature conditions that would otherwise cause expansion or contraction. This is accomplished by reason of the fact that the housing is laterally corrugated and before it actually changes its effective length with respect to the axis of rotation, much of the expansive or contractive forces will be spent in de-forming the corrugated portion of the housing. Such an arrangement relieves the central portion of the rotor assembly of some degree of strain of expansion and contraction that might otherwise be imposed upon it, tending to cause variance in bearing clearances and consequent binding or end play between the rotor pivot and its bearings carried by the housing.

I claim:

1. In combination with a rotor and a housing therefor, a concentrically disposed pivot carried by said rotor and extending past the ends of said rotor and provided with bearing surfaces, bearings carried by said housing for engaging said bearing surfaces, and means for providing and maintaining compensated constant clearance between said bearings and freedom of operation of said rotor about its axis of rotation over a predetermined range of temperature conditions, said means comprising a strut extending, with clearance, through and past the confines of said housing and concentrically coincident with axis of rotation of said rotor and having adjustment devices for engaging said housing for effecting direct end clamping pressure on said housing so as to pre-contract the same to an extent equal to that which would occur at the lowest degree of said predetermined temperature range and simultaneously placing said strut under such tension as to pre-expand the same to an extent equal to that which would occur at the highest degree of said predetermined temperature range.

2. In a gyroscopic assembly for automatic pilots including a rotor and a housing therefor, a vertically disposed central pivot carried by said rotor and provided with bearing surfaces, said housing carrying bearing assemblies engaging said bearing surfaces, a rigid strut extending, with clearance, vertically through said housing concentrically coincident with the vertical axis of rotation of said rotor and provided with adjustment and locking devices for exerting a clamping force and compressing force simultaneously on the upper and lower walls of said housing to pre-contract the same and pre-expand the effective length of said strut both to a predetermined extent for the purpose of compensating for temperature variations and the coefficients of expansion of said pivot and housing for maintaining constant clearance between said housing supported bearings and the bearing surfaces of said pivot.

3. In a gyroscopic assembly including a rotor and a housing therefor, a central pivot carried by said rotor and provided with bearing surfaces at either end, said housing carrying bearing assemblies engaging said bearing surfaces, a rigid strut extending, with clearance, longitudinally through said pivot and housing, said housing being constructed of a material having a relatively high coefficient of expansion and said pivot and strut being of a material of relatively low coefficient of expansion, said strut being provided with adjustment and locking devices to engage the opposite walls of said housing in clamping position for pre-contracting said housing and pre-expanding the effective length of said strut both to a predetermined extent, for compensating for temperature and expansion variations of said strut and housing for the purpose of maintaining constant clearance between said bearing assemblies and bearing surfaces.

4. In a gyroscopic assembly including a rotor and a housing therefor, a central pivot carried by said rotor and provided with bearing surfaces at either end, said housing carrying bearing assemblies engaging said bearing surfaces, a rigid strut extending, with clearance, through said pivot and housing and coincident with the axis of said rotor, said housing having a relatively high coefficient of expansion and said pivot and strut having a relatively low coefficient of expansion, said strut being provided with adjustment and locking devices for engaging and exerting a clamping force on the two sides of said housing, longitudinally of the rotor axis, to pre-contract said housing and pre-expand the effective length of said strut both to a predetermined extent to compensate for temperature variations and the coefficients of expansion of said strut, pivot and housing, said housing having its outer portions, with respect to its axis of rotation, preformed with lateral corrugations and thus under extreme high and low temperature conditions being adapted to deform rather than to expand or contract longitudinally of said axis.

5. In a rotor assembly including a rotor and a housing therefor, end supports for said housing, a central bearing member, said supports carrying relatively movable end bearing assemblies engaging said central bearing, means for compensating for temperature variations and the coefficients of expansion of the component parts of the assembly that differ, said means comprising a clamping device for exerting a clamping force on said rotor assembly and its housing for pre-contracting said rotor assembly and pre-expanding the effective length of said clamping device under tension both to a predetermined extent, said housing being of a material of a relatively high coefficient of expansion and having its outer body portions, with respect to its axis of rotation, pre-formed with lateral corrugations and thus under extreme high and low temperature conditions being adapted to straighten out laterally of the rotational axis rather than to expand or contract longitudinally thereof.

6. In a gyroscope structure, in combination, a gyroscope wheel having a structural axis of rotation integral therewith and provided with resiliently supported bearings for rotation therein, a stationary tension strut member passing through said rotatable gyro wheel axis and adapted to limit the longitudinal movement of said bearings and support within relatively narrow limits throughout relatively wide ranges of temperature conditions.

7. In a gyroscope structure, in combination, a gyroscope wheel provided with an axle shaft of a material having a relatively low coefficient of expansion, bearing members and supports therefor formed of a material having a relatively high coefficient of expansion, and a stationary strut member the axis of which coincides with that of said gyro wheel, said strut member being constructed of a material having a relatively low coefficient of expansion whereby a relatively constant bearing clearance and freedom of operation between said relatively movable parts is obtained throughout a predetermined relatively wide range of temperature conditions.

8. In a gyroscope structure comprising a gyroscope wheel, in combination with a supporting structure, said gyroscope wheel being provided with an axle shaft constructed of a material of relatively low coefficient of expansion, said axle shaft having conical bearing surfaces at either end, ball bearings for engaging said conical bearing surfaces, said ball bearings being supported by a structure constructed of a material having a relatively high coefficient of expansion, a tension strut member the axis of which coincides with that of said gyroscope wheel, said strut having a relatively low coefficient of expansion and being adapted to maintain relatively constant bearing clearance between said ball bearings and said conical bearings throughout a predetermined relatively wide range of temperature conditions.

RALPH M. HEINTZ.